(12) United States Patent
Seiyama et al.

(10) Patent No.: US 7,455,056 B2
(45) Date of Patent: Nov. 25, 2008

(54) VALVE DEVICE

(75) Inventors: Hideyuki Seiyama, Oyama (JP); Taisei Okubo, Oyama (JP); Kouichi Okaya, Oyama (JP); Tatsuya Iwazaki, Oyama (JP); Hiroshi Tsuda, Oyama (JP)

(73) Assignee: Komatsu Ltd., Tokyo (JP)

( * ) Notice: Subject to any disclaimer, the term of this patent is extended or adjusted under 35 U.S.C. 154(b) by 102 days.

(21) Appl. No.: 10/594,910

(22) PCT Filed: Apr. 1, 2005

(86) PCT No.: PCT/JP2005/006498

§ 371 (c)(1),
(2), (4) Date: Sep. 29, 2006

(87) PCT Pub. No.: WO2005/095834

PCT Pub. Date: Oct. 13, 2005

(65) Prior Publication Data

US 2007/0194260 A1 Aug. 23, 2007

(30) Foreign Application Priority Data

Apr. 1, 2004 (JP) ............................. 2004-108604
May 7, 2004 (JP) ............................. 2004-138054
Jun. 10, 2004 (JP) ............................. 2004-172656

(51) Int. Cl.
*F02M 25/07* (2006.01)
*F02B 47/08* (2006.01)
*F01L 1/46* (2006.01)
*F01L 9/02* (2006.01)

(52) U.S. Cl. ............................. 123/568.11; 123/188.6; 123/568.12; 123/568.26

(58) Field of Classification Search ............ 123/188.6, 123/188.9, 568.11, 568.21, 568.26; 251/129.15, 251/318, 322, 323; 60/278, 279, 605.2
See application file for complete search history.

(56) References Cited

U.S. PATENT DOCUMENTS 2,418,674 A * 4/1947 Steiner ................ 123/188.6

(Continued)

FOREIGN PATENT DOCUMENTS

EP 0 990 826 A1 4/2000

(Continued)

OTHER PUBLICATIONS

International Preliminary Report on Patentability, Chapter I of the Patent Cooperation Treaty for PCT/JP2005/006498, 5 sheets.

(Continued)

*Primary Examiner*—Willis R Wolfe, Jr.
(74) *Attorney, Agent, or Firm*—Frishauf, Holtz, Goodman & Chick, P.C.

(57) ABSTRACT

A valve device includes a valve housing body having a passage for fluid, a valve guide formed in the valve housing body, a valve stem sliding in the valve guide for opening and closing the valve, a hydraulic actuator for opening and closing a valve, and a hydraulic control valve for controlling the hydraulic actuator, in which a scraper is provided on an end of the passage side of the valve guide for scraping the deposits on the valve stem. Further, the hydraulic actuator and the hydraulic control valve are integrated with the valve housing body. Furthermore, the device is provided with a nozzle oriented toward the valve guide and having an orifice for jetting pressured oil for cooling.

18 Claims, 10 Drawing Sheets

U.S. PATENT DOCUMENTS

| | | | |
|---|---|---|---|
| 3,868,868 A * | 3/1975 | Chana | 60/278 |
| 4,497,335 A * | 2/1985 | Masuda | 123/568.29 |
| 5,253,619 A | 10/1993 | Richeson et al. | |
| 6,347,620 B1 | 2/2002 | Miyake | |
| 6,422,217 B1 * | 7/2002 | Feucht et al. | 123/568.11 |
| 6,474,362 B1 | 11/2002 | Hope et al. | |
| 6,481,424 B2 * | 11/2002 | Bircann et al. | 123/568.11 |
| 2003/0006390 A1 * | 1/2003 | Smith et al. | 251/129.15 |

FOREIGN PATENT DOCUMENTS

| | | |
|---|---|---|
| JP | 58-144655 A | 8/1983 |
| JP | 6-212922 A | 8/1994 |
| JP | 7-332169 A | 12/1995 |
| JP | 08-303307 A | 11/1996 |
| JP | 11-336616 A | 12/1999 |
| KR | 2001-0013821 A | 2/2001 |
| WO | WO 99/54650 A1 | 10/1999 |

OTHER PUBLICATIONS

Microfilm of specification and drawings annexed to request of Japanese Utility Model No. 89174/1981 (Laid open No. 200767/1982) Nippondenso Co., Ltd. Dec. 21, 1982.

Microfilm of specification and drawings annexed to the request of Japanese Utility Model No. 177514/1980 (Laid Open No. 101343/1982); Komatsu Ltd., Jun. 22, 1982.

Koran Office Action dated Sep. 8, 2008 and English translation thereof issued in counterpart Japanese Appln. No. 2008-7014514.

* cited by examiner

PORTION P

VALVE DEVICE

This application is a U.S. National Phase Application under 35USC 371of International Application PCT/JP2005/006498filed Apr. 1, 2005.

TECHNICAL FIELD

The invention relates to a valve device, and more particularly to a valve device suitable to be used for performing EGR.

BACKGROUND ART

As a measure to reduce the nitrogen oxides (NOx) contained in the exhaust gas of a diesel engine, there is conventionally known an EGR valve device, which is an exhaust gas passage valve, for performing so called EGR (Exhaust Gas Recirculation) in which a part of the exhaust gas generated by the engine is returned to the intake system of the engine for recirculation (refer to, for example, Patent Document 1 and Patent Document 2).

EGR valve is not only exposed to the high temperature exhaust gas introduced from exhaust pipe, but also exposed to the exhaust gas cooled by a recirculation exhaust gas cooler and therefore having reduced temperature. Fine particles such as carbon exist in the exhaust gas, and the carbon will deposit on the valve stem of the EGR valve. Further, in the exhaust gas having reduced temperature, since sulfuric acid will be generated from the sulfur content in fuel, corrosion by the sulfuric acid will occur, and the carbon will further deposit on the corroded part to cause the fixing, so that operation failure of the EGR valve will possibly occur.

As shown in FIG. 10, the exhaust gas recirculation control valve 105, which is an EGR valve device, disclosed in Patent Document 1 includes a housing having an exhaust gas passage thereinside, a control valve 106 for adjusting the quantity of the exhaust gas flowing through the exhaust gas passage of the housing, in which a stem 117 holding the control valve 106 is provided to freely slide in a guiding member 114 having a penetrating hole. A holder 131 for forming a predetermined space for the stem 117 is provided on the control valve side of the guiding member 114 provided in the housing. Further, metal scrubber filler 130 contacting the circumference of the stem 117 is provided inside the predetermined space of the holder 131, and the carbon deposited on the stem 117 is wiped off by the metal scrubber filler 130 while the stem 117 is sliding.

Further, the EGR valve device disclosed in Patent Document 2 includes, as shown in FIG. 9, a housing 112 having an exhaust gas passage 113 thereinside, a valve element 116 for adjusting the quantity of the exhaust gas flowing through the exhaust gas passage 113 of the housing 112, in which the valve element 116 freely slides via a valve guide 115.

A hydraulic actuator 118 for opening and closing the valve element 116 is provided in the upper portion of the housing 112. The hydraulic actuator 118 consists of a cylinder 119 and a piston 120 provided to freely slide inside the cylinder 119. The hydraulic actuator 118 works by moving the piston 120 with the pressured oil supplied from a solenoid valve 133 through an oil sending line 132.

Further, the EGR valve device is provided with a cooling and lubricating section 135 for cooling and lubricating the valve guide 115 and the like by the supplied pressured oil. The cooling and lubricating section 135 is constituted by, corresponding to the stroke of the piston 120 in the valve opening direction, an oil passage 136 which connects a front chamber 119a of the piston 120 and a spring chamber 127, the spring chamber 127 functioning both as a cooling oil jacket and as a lubricating oil reservoir, and an outlet port 137 for discharging the oil from the spring chamber 127. The oil passage 136 is formed by grooving the inner circumference of the cylinder 119 along the axial direction thereof.

On the one end side of the oil passage 136, when the piston 120 moves to the position P1 indicated by dashed line at full stroke, it opens at the front chamber 119a by a predetermined area, and the pressured oil introduced from the front chamber 119a can be introduced toward the periphery of the valve guide 115 as shown by the arrow.

When the EGR valve device is in operation, the pressured oil forcedly fed by the oil pump (not shown) is sent to the hydraulic actuator 118 by the solenoid valve 133. The piston 120 performs stroke driven by the pressured oil, and as a result the pressured oil introduced into the spring chamber 127 returns to the oil pan from the outlet port 137 after being flowed in contact with the periphery of the valve guide 115 and a stem 116a. Thus the heat of the valve guide 115 and the stem 116a is taken by the pressured oil flowing therearound and emitted to the out, and therefore the valve guide 115 and the stem 116a are prevented from overheating.

[Patent Document 1]: Japanese Patent Laid-Open Publication No. Hei11-336616.

[Patent Document 2]: Japanese Patent Laid-Open Publication No. Hei07-332169 (Page 3-4, FIG. 1, and FIG. 2).

DISCLOSURE OF THE INVENTION

[Problems to be Solved by the Invention]

However, the EGR valve devices disclosed in Patent Document 1 and Patent Document 2 have the following problems.

First, in the EGR valve device disclosed in Patent Document 1, since the deposits such as carbon is wiped off by metal scrubber filler, when being used for long period of time, the mesh of the metal scrubber filler will be clogged with carbon, and therefore the effect of wiping off the carbon will be lost.

Second, in the EGR valve device disclosed in Patent Document 2, since the solenoid valve 133 is provided separately from the housing 112, the oil sending line 132 for sending the pressured oil to the solenoid valve 133 and to the housing 112 is needed, so that the number of components is increased. Also, since the solenoid valve 133 is provided separately from the housing 112, the space for installing the EGR valve device is increased.

Third, in the EGR valve device disclosed in Patent Document 2, since the oil passage 136 of the cooling and lubricating section 135 is formed by grooving the inner circumference of the cylinder 119 along the axial direction thereof, though the pressured oil can flow into the spring chamber 127, the flow velocity of the pressured oil is low. Consequently, the pressured oil for cooling can not strongly jet toward the valve guide 115 and the stem 116a, therefore cooling effect is lowered.

In view of the foregoing, a first object of the present invention is to provide a valve device which never fails in operation even if it is used for a long period of time; a second object of the present invention is to provide a compact EGR valve device having less components; and a third object of the present invention is to provide an EGR valve device having good cooling performance.

[Means for Solving the Problems]

The valve device according to the present invention comprises: a valve housing body having a passage for fluid; a valve guide arranged in the valve housing body; a valve stem sliding in the valve guide to open and close the valve; and a scraper provided on a passage side of the valve guide, the scraper having a truncated cone-cutting edge.

With such arrangement, since the scraper valve stem has a truncated cone-cutting edge, the deposits deposited on the valve stem can be scraped by the scraper when the valve stem slides upward, it is possible to provide a valve device which never fail in operation even if it is used for a long period of time.

In the valve device according to the present invention, an inner diameter of the scraper is preferably 0.2-1.0 mm larger than an outer diameter of the valve stem.

With such arrangement, it is possible to provide a valve device in which the small quantity of deposits remaining in clearance between the valve stem and the cutting edge will not solidify to cause the fixing of the cutting edge and the small diameter shaft part of the valve stem, and deposits can be effectively scraped.

In the valve device according to the present invention, a distance between an end of the scraper and a passage side end of the valve guide is preferably longer than a stroke of the valve.

With such arrangement, the part of the valve stem deposited with deposits such as carbon is prevented from entering the valve guide, and therefore the fixing due to biting in of the deposits such as carbon can be prevented.

In the valve device according to the present invention, it is preferred that an outer diameter of the valve stem is smaller in a section corresponding to the scraper than in a section corresponding to the valve guide; and an inner diameter of the scraper is equal to the outer diameter of the valve stem in a section corresponding to the valve guide.

With such arrangement, since the deposits and the valve stem has the same outer diameter, even if the valve stem is made short and therefore the part where the deposits deposited thereon is scraped by the scraper enters the valve guide when the valve stem is slid upward, defective sliding will not occur. Thus the valve device can be made compact by reducing the length of the valve stem.

In the valve device according to the present invention, it is preferred that a seal member that applies gripping force onto an outer circumference of the valve stem is provided at a passage side end of the valve guide.

With such arrangement, foreign matter contained in the passing fluid can be prevented from entering into the valve guide through the valve stem and the housing.

In the valve device according to the present invention, it is preferred that the fluid is exhaust gas recirculated to an internal combustion engine for performing EGR, and the valve device is an EGR valve.

With such arrangement, it is possible to provide a valve device suitable to be used as a valve for performing EGR.

The EGR valve device according to the present invention comprises: a valve housing body; a hydraulic actuator provided on the valve housing body to open and close a valve; an electromagnetic proportional actuator provided on the valve housing body; and a hydraulic control valve advanced and retracted by the electromagnetic proportional actuator, the hydraulic control valve controlling hydraulic pressure acting on the hydraulic actuator by balancing a force of the electromagnetic proportional actuator and a hydraulic force; wherein the hydraulic actuator and the hydraulic control valve are integrated with the valve housing body.

With such arrangement, since the hydraulic actuator and the hydraulic control valve are integrated with the valve housing body, pipes for connecting the hydraulic control valve and the valve housing body is not needed compared to the case in which the hydraulic control valve is made separately from the valve housing body, therefore the number of components can be reduced, and the EGR valve device can be made compact compared to the case in which the hydraulic control valve is made separately from the valve housing body.

In the EGR valve device according to the present invention, it is preferred that the valve housing body is separated into a valve section including the valve and a drive section including the hydraulic actuator and the hydraulic control valve; and fixing sections for the valve section and the drive section are provided on a circle around an axis of the valve.

With such arrangement, since the valve section, which includes the valve, and the drive section, which includes the hydraulic actuator and the hydraulic control valve, can be easily separated from each other, the components can be replaced independently even if failure occurs, therefore maintenance cost can be reduced. Further, it is possible to choose the mounting direction according to the mounting place to make the drive section easy to assemble.

In the EGR valve device according to the present invention, the hydraulic actuator is preferably provided with a stopper for preventing a piston from disengaging from a hydraulic cylinder.

With such arrangement, when the valve is broken, the piston is prevented from getting out from the hydraulic cylinder, thus the hydraulic pressure is sealed, and the hydraulic pressure can be maintained.

In the EGR valve device according to the present invention, it is preferred that the hydraulic actuator is a reciprocating-piston type hydraulic actuator; the hydraulic control valve is a spool hydraulic control valve; and the hydraulic actuator and the hydraulic control valve are arranged in parallel with a same advancing/retreating direction.

With such arrangement, hydraulic circuit can be easily formed, and the space for installing the EGR valve device can be reduced.

The EGR valve device according to the present invention comprises: a valve housing body; a valve guide provided inside the valve housing body for guiding a slide movement of a valve stem; and a nozzle arranged toward the valve guide and having an orifice for jetting cooling oil.

With such arrangement, since the cooling oil is jetted toward the valve guide, flow velocity of the cooling medium around the valve guide is increased, and the cooling performance is improved.

In the EGR valve device according to the present invention, it is preferred that a hydraulic pressure supplied to the nozzle is generated by an internal combustion engine equipped with the EGR valve device during an operation of the internal combustion engine.

With such arrangement, even if the EGR valve device is not working, the cooling oil can constantly be jetted as long as the engine is working, therefore a heat soak back, which increases the temperature around by accumulated heat, can be prevented from occurring.

In the EGR valve device according to the present invention, it is preferred that the device further comprises: a hydraulic actuator for opening and closing a valve; and a hydraulic control valve for controlling the hydraulic actuator; in which a hydraulic pressure supplied to the nozzle is a hydraulic pressure branched from the hydraulic circuit for supplying the hydraulic pressure to the hydraulic control valve.

With such arrangement, since the pressured oil supplied to the nozzle is branched from the pressured oil supply circuit for supplying the pressured oil to the hydraulic control valve, hydraulic pressure for cooling is not needed to be prepared separately, so that the structure is simplified.

In the EGR valve device according to the present invention, it is preferred that the device further comprises: a hydraulic actuator for opening and closing a valve; and a hydraulic control valve for controlling the hydraulic actuator; in which a hydraulic pressure supplied to the nozzle is a hydraulic pressure branched from the hydraulic circuit connecting the hydraulic actuator and the hydraulic control valve.

With such arrangement, although the cooling oil can only be jetted while the EGR valve device is working, since the nozzle is provided very close to the hydraulic circuit for driving the hydraulic actuator, processing and structure can be simplified.

EXPLANATION OF CODES

10: EGR valve device; 11: housing; 11T: exhaust gas passage; 12, 12A: case; 12W, 12YA: oil passage also serving as an cooling oil passage; 12P, 12PA: cylinder; 12V, 12VA: orifice; 12Y, 12WA: oil passage; 13: solenoid; 14: valve; 16: valve stem; 17: valve guide; 21: scraper; 21H: cutting edge; 25: seal (as a seal member); 28: piston; 34: spool; DS: inner diameter; DG, DJ: outer diameter; TC: deposits; TS: difference.

BEST MODE FOR CARRYING OUT THE INVENTION

Preferred embodiments of the present invention are described below referring to the accompanying drawings.

Figure 1:
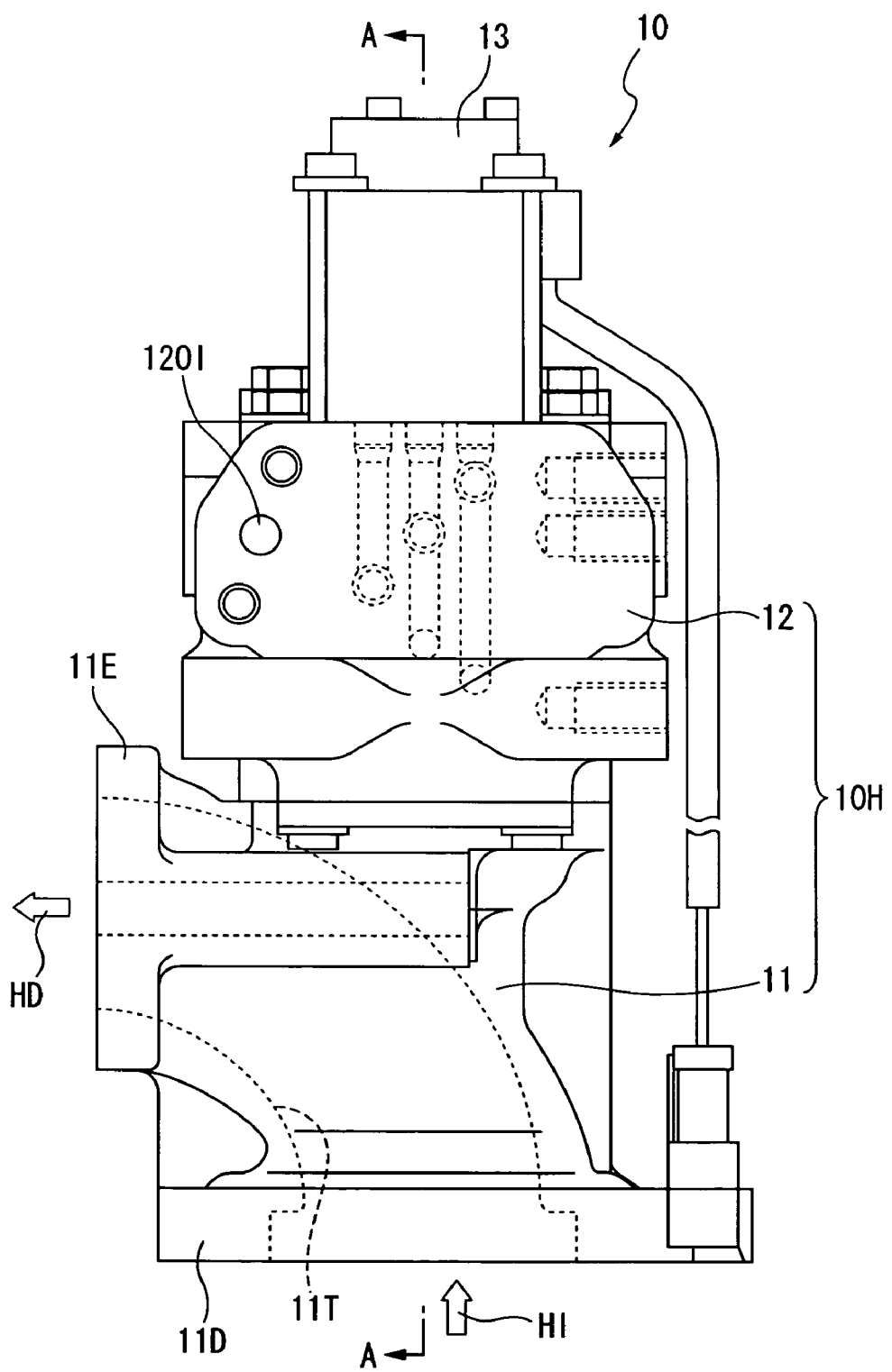
FIG. 1 is a front elevational view showing an EGR valve device according to the present invention.
Figure 2:
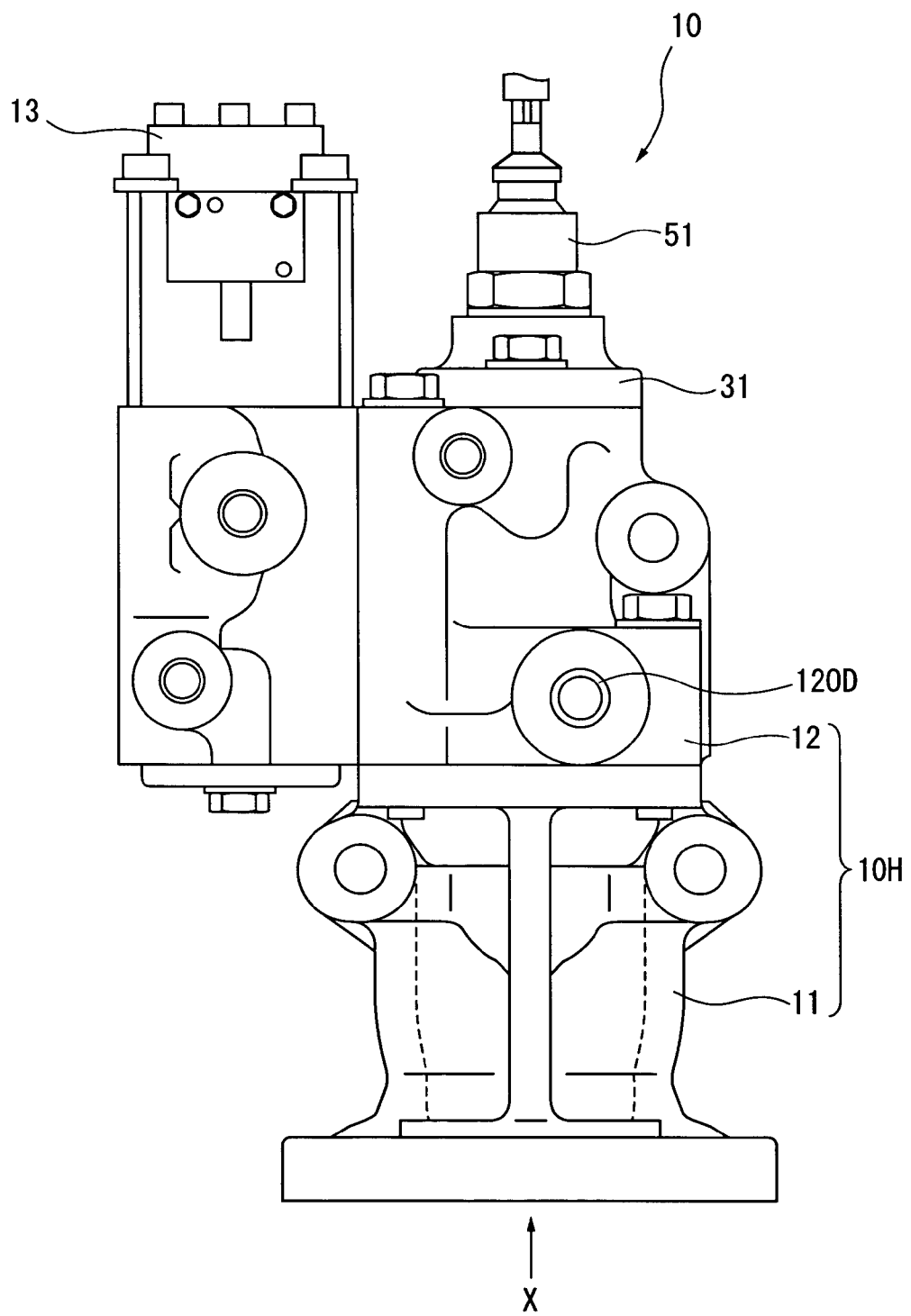
FIG. 2 is a right side view showing the EGR valve device according to the present invention.
Figure 3:
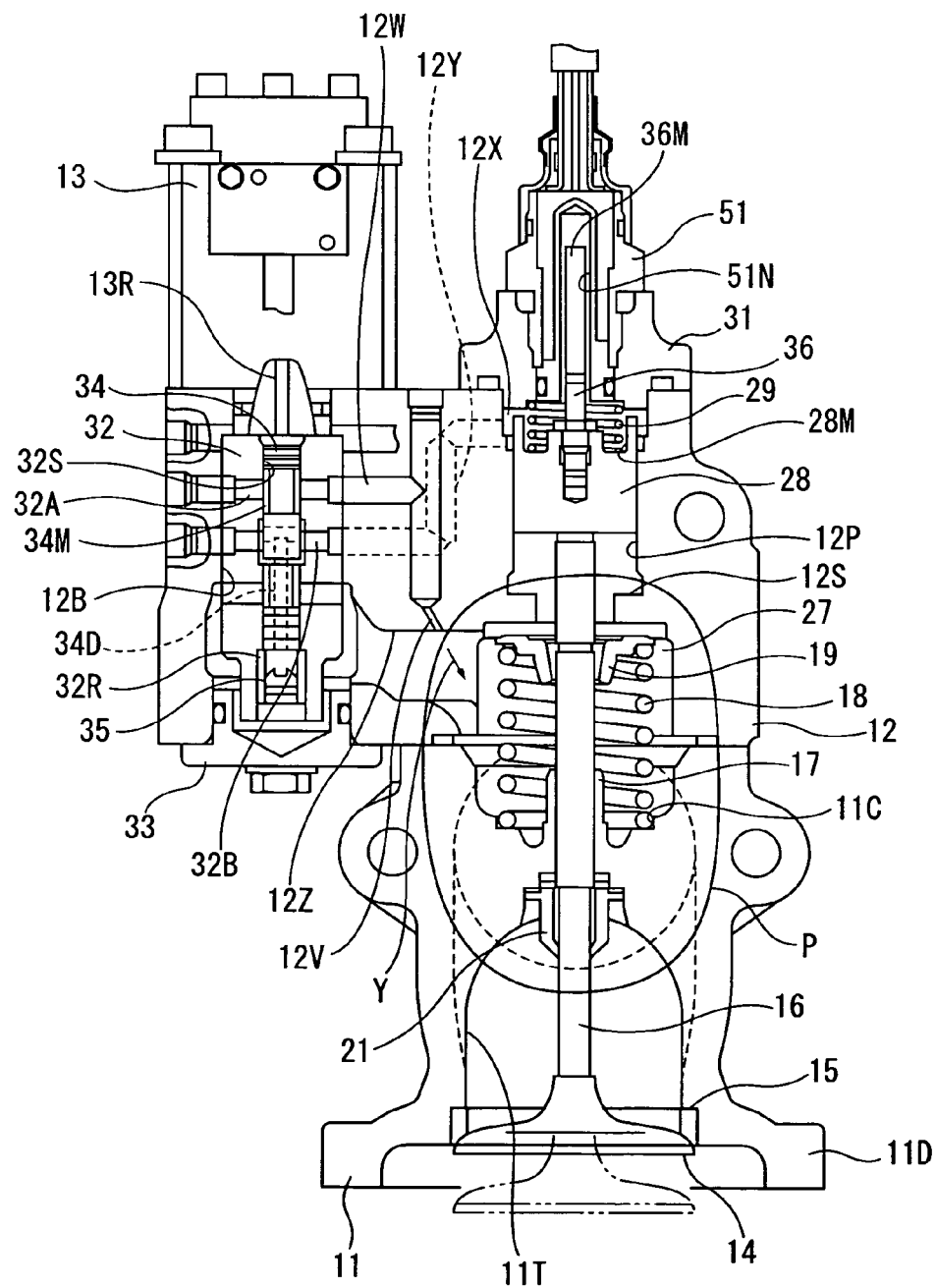
FIG. 3 is a cross section taken along A-A line of FIG. 1.
Figure 4:
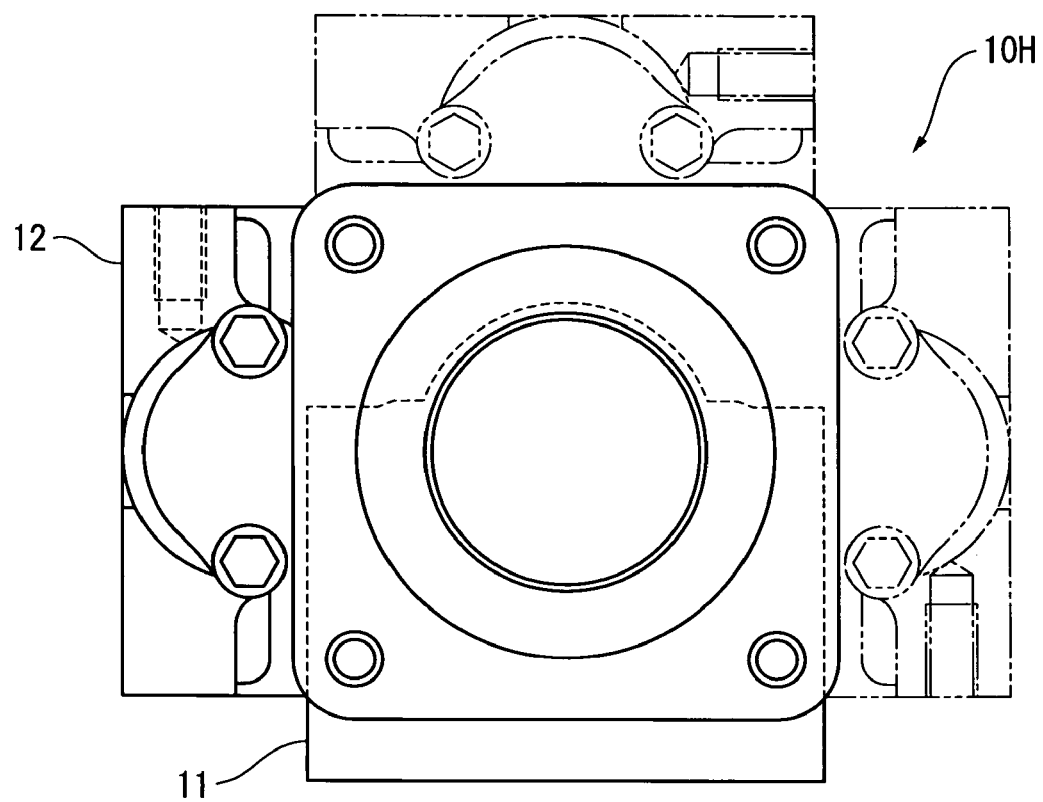
FIG. 4 is a bottom view showing the EGR valve device according to the present invention viewed from the X-direction of FIG. 2.

FIG. 1 is a front elevational view showing a valve device according to the present invention, and FIG. 2 is a right side view of the same. FIG. 3 is a cross section taken along A-A line of FIG. 1. FIG. 4 is a bottom view viewed from the X-direction of FIG. 2.

As shown in FIG. 1 and FIG. 2, an EGR valve device 10 (which is the valve device of the present invention) has a housing 11, a case 12, a solenoid 13, and a position sensor 51.

A valve housing body 10H is formed by the housing 11 and the case 12 which is mounted on the upper surface of the housing 11 by bolts.

As shown in FIG. 4, the valve housing body 10H is separated into two parts of the housing 11 (which is a valve section) and the case 12 (which is a drive section), and, by providing bolt holes and screw holes on the circumference centering the axis of a valve 14 at an angular interval of 90 degrees, both the housing 11 and the case 12 can be mounted to each other in a manner of being displaced from each other in circumferential direction. Accordingly, if the case 12 is displaced from the housing 11 by 90 degrees each time, it will be respectively mounted at the positions in the direction indicated by two-dot chain line. Incidentally, the direction of the case 12 can be adjusted in further detail if the bolt holes and screw holes are provided at an angular interval of 15 degrees, 30 degrees, 45 degrees, or 60 degrees.

Incidentally, the features of the valve housing body 10H, the housing 11, and the case 12 described herein correspond to an eighth aspect of the present invention.

Now back to FIG. 1 and FIG. 2, a solenoid 13 is mounted on the upper surface of the case 12 by bolts, and a position sensor 51 is screwed into a cap 31 which is mounted on the upper surface of the case 12 by bolts. The housing 11 has an exhaust gas passage 11T which is a passage for the exhaust gas as passing fluid. Provided on the inlet of the exhaust gas passage 11T is an inlet flange 11D, and provided on the outlet of the same is an outlet flange 11E. The inlet flange 11D for being attached to the inlet portion of the exhaust gas of the EGR is provided at the lower portion of the housing 11, and the outlet flange 11E for being attached to the introducing portion of the exhaust gas of the EGR is provided to the side surface of the housing 11. The exhaust gas is flowed along the direction from the arrow HI to the arrow HD.

As shown in FIG. 3, provided inside the housing 11 is a valve 14 which is an adjusting valve for adjusting the opening level of the exhaust gas passage 11T. Provided to the exhaust gas passage 11T on the side of the inlet flange 11D thereof is an annular valve seat 15 for being abutted by the valve 14. The valve 14 is provided with a valve stem 16 as a shaft portion, the valve stem 16 sliding up and down through the inside of the of the valve guide 17 which is a guiding portion provided in the housing 11. A retainer 19, which receives a valve spring 18, is provided on the upper portion of the valve stem 16. The valve spring 18 abuts a spring holding seat 11C of the housing 11 and the retainer 19 respectively. The valve 14 is pushed upward by the valve spring 18 to abut the annular valve seat 15.

Figure 5:
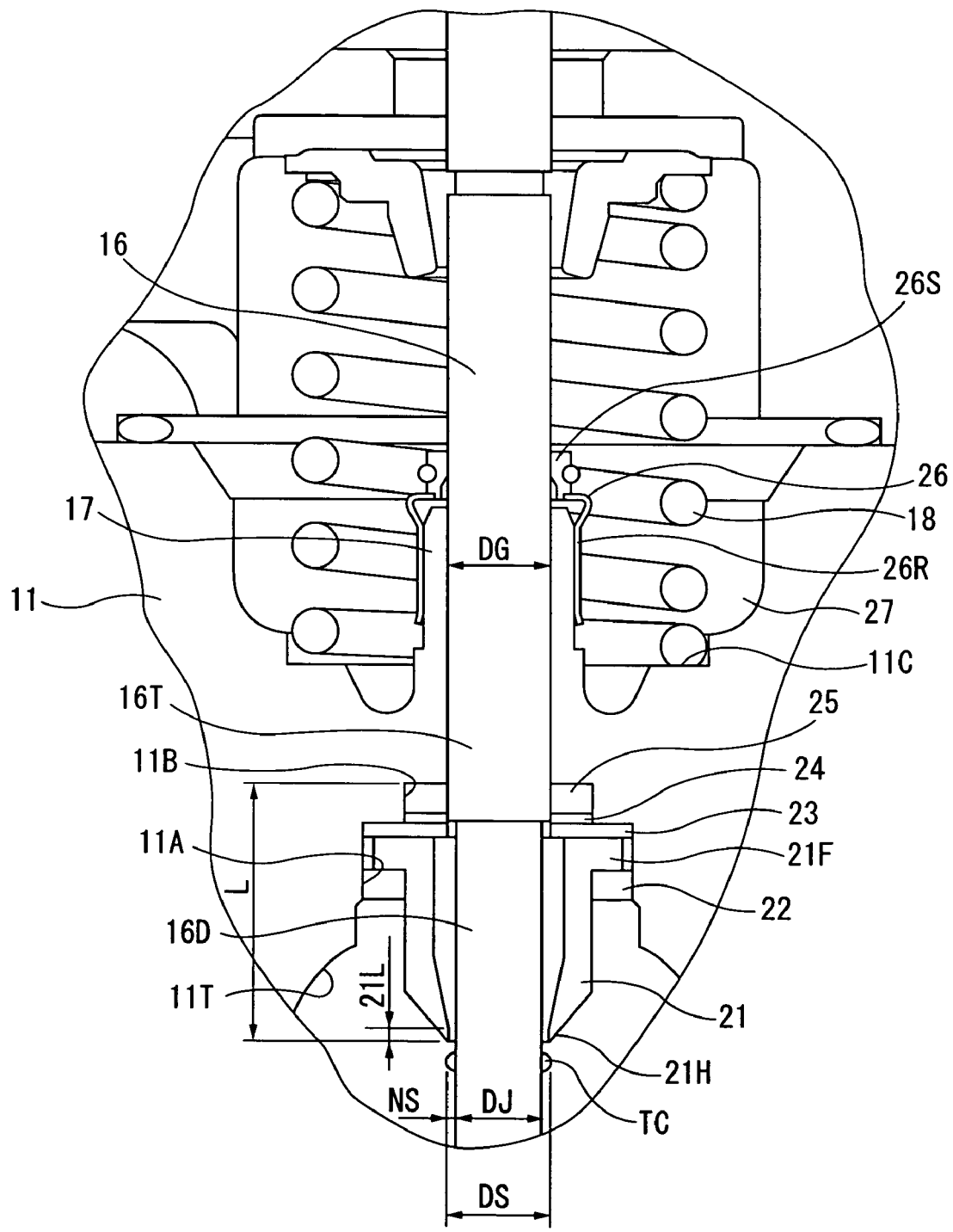
FIG. 5 is a partial view showing the detail of the portion P in FIG. 3.

As shown in FIG. 5 which shows the detail of the portion P in FIG. 3, a scraper 21, which is adapted to scrape the carbon and the like contained in the exhaust gas and deposited on the surface of the valve stem 16, is provided on the valve stem 16 on the side of the exhaust gas passage 11T. The scraper 21 includes a flange 21F at the cylindrical upper portion thereof. The flange 21F of the scraper 21 is inserted into a mounting hole 11A formed in the housing 11 through a plate 23. Further, the scraper 21 is installed by having the flange 21F thereof been pushed by a ring 22 pressed into the mounting hole 11A. The scraper 21 is made of corrosion-resistant material such as stainless steel.

An insulator 24, as a heat insulating material, is provided on the upper surface of the plate 23. The insulator 24 prevents the heat of the exhaust gas from being transmitted to the upper portion of the valve stem 16 through the scraper 21.

Provided on the upper surface of the insulator 24 is a seal 25 which is a seal member of the present invention.

The seal 25 is fitted into a mounting hole 11B formed in the housing 11. The seal 25 has one end thereof been closely contacted to the bottom surface of the mounting hole 11B of the housing 11, and has the inner peripheral surface thereof been closely contacted to the outer peripheral surface of the valve stem 16. With thus arrangement, the exhaust gas as well as the carbon, the oil and the like suspending in the exhaust gas are prevented from entering into the inside of the upper valve guide 17 via the valve stem 16 and the mounting hole 11B of the housing 11.

The seal 25 is made of tetrafluoroethylene resin having heat resistance. To make the inner peripheral surface of the seal 25, which has big thermal expansion, in close contact with the outer peripheral surface of the valve stem 16 constantly, the seal 25 has the following structure.

Figure 6A:
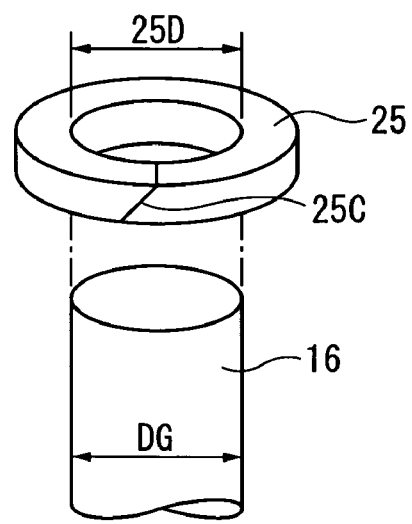
FIG. 6A is an illustration showing the structure of a seal member.
Figure 6B:
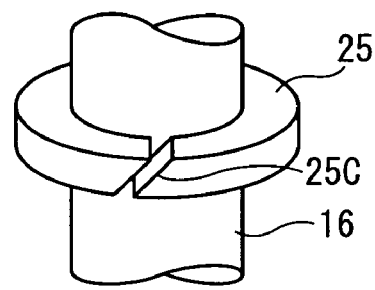
FIG. 6B is an illustration showing the state of the seal member at normal temperature.
Figure 6C:
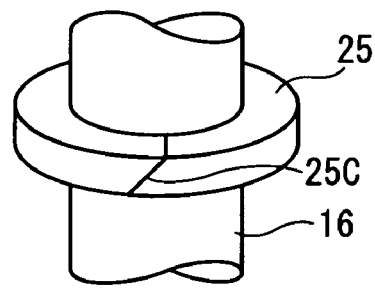
FIG. 6C is an illustration showing the state of the seal member when temperature rises.

As shown in FIG. 6A, which shows the structure of the seal 25, the seal 25 is formed with a slit 25C as a bias cut oblique with respect to the axial direction of the seal 25. The inner diameter 25D of the seal 25 is smaller than the outer diameter DG of the valve stem 16, so that when the seal 25 is fitted to the valve stem 16, the seal 25 is pressed to be extended as shown in FIG. 6B, an inward tension force is generated, a biasing force for grasping the outer circumference of the valve stem is generated, and the slit 25C opens. When the exhaust gas is flowing through the EGR valve device 10, the temperature of the seal 25 will rise, the seal 25 will thermally expand in circumferential direction, so that the space of the slit 25C is eliminated as shown in FIG. 6C, while the inward tension force, namely the biasing force for grasping the outer circumference of the valve stem is maintained. Incidentally, the seal 25 may be made of tetrafluoroethylene resin blended with bronze powder, or the seal 25 may be made of a sintered alloy formed in a ring shape having an inside diameter contractive force.

Incidentally, the features of the seal 25 described herein correspond to a fifth aspect of the present invention.

The valve guide 17 is provided with an oil seal 26. The oil seal 26 has a cylindrical ring 26R and a lip seal 26S. The lip seal 26S closely contacts the valve stem 16, and the ring 26R closely contacts the outer surface of the valve guide 17, so that the oil in an oil chamber 27 formed by the case 12 and the housing 11 is prevented from being leaked to the exhaust gas passage 11T.

As shown in FIG. 5, the inner diameter and outer diameter of the cylindrical lower portion of the scraper 21 is gradually decreased toward the front end so that a truncated cone-shaped cutting edge 21H is formed. The inner diameter of the cutting edge 21H includes a straight bore 21L parallel to a small diameter shaft part 16D of the valve stem 16. The straight bore 21L has predetermined length such as 1 mm. Owing to the straight bore 21L, the strength of the cutting edge 21H is secured, and the deforming of the cutting edge 21H is prevented from occurring.

Incidentally, the features of the scraper 21 described herein correspond to a first aspect of the present invention.

A clearance NS is provided between the inner diameter DS of the cutting edge 21H of the scraper 21 and the outer diameter DJ of the small diameter shaft part 16D of the valve stem 16, and, to serve this purpose, a difference TS is made between the inner diameter DS of the cutting edge 21H of the scraper 21 and the outer diameter DJ of the valve stem 16 (The difference TS is twice the clearance N). The outer diameter of the small diameter shaft part 16D is set to be about 0.5 mm smaller than that of a large diameter shaft part 16T of the valve stem 16. Even when the valve stem 16 slides, the position of the cutting edge 21H of the scraper 21 remains within the range of the small diameter shaft part 16D in the axial direction. The difference TS between the inner diameter DS of the cutting edge 21H of the scraper 21 and the outer diameter DJ of the valve stem 16 is set to 0.2-1.0 mm. By setting the difference TS between the inner diameter DS and the outer diameter DJ to such a value, the deposits TC such as carbon contained in the exhaust gas and deposited on the surface of the small diameter shaft part 16D of the valve stem 16 can be scraped by the cutting edge 21H of the scraper 21 when the valve stem 16 slides upward against the valve guide 17 of the housing 11.

It is known through experiment results that if the diameter difference TS between the inner diameter DS and the outer diameter DJ is smaller than 0.2 mm, though the deposits TC can be effectively scraped by the cutting edge 21H, the valve 14 can not be moved after a definite time is elapsed in a state in which the valve stem 16 is stopped as the small quantity of deposits TC remained in the clearance between the small diameter shaft part 16D of the valve stem 16 and the cutting edge 21H is solidified and therefore the small diameter shaft part 16D and the cutting edge 21H are adhered to each other. Also, if the diameter difference TS between the inner diameter DS and the outer diameter DJ is larger than 1.0 mm, then the deposits TC can not be effectively scraped by the cutting edge 21H.

Incidentally, the features of the scraper 21 and the valve stem 16 described herein correspond to a second aspect of the present invention.

The scraper 21 is so disposed that the distance L between itself and the end of the valve guide 17 on the side of the exhaust gas passage 11T is longer than the stroke of the valve 14. With such arrangement, even when the valve 14 performs full stroke, the part with the small quantity of deposits TC remaining in clearance between the small diameter shaft part 16D of the valve stem 16 and the cutting edge 21H is prevented from entering the valve guide 17, and therefore the fixing caused by biting in of deposits can be prevented.

Incidentally, the features of the scraper 21 and the valve guide 17 described herein correspond to a third aspect of the present invention.

the inner diameter DS of the cutting edge 21H of the scraper 21 is made to be equal to the outer diameter DG of the large diameter shaft part 16T of the valve stem 16, which is inserted into the valve guide 17 to slide in the valve guide 17. With such arrangement, since the deposits TC and the large diameter shaft part 16T has the same outer diameter, even if the dimensions are so set that the part of the small diameter shaft part 16D, where the deposits TC deposited thereon are scraped by the scraper 21, enters the valve guide 17 when the valve stem 16 is slid upward, defective sliding will not occur. Accordingly, even if the length of the large diameter shaft part 16T of the valve stem 16 is set short and therefore the part where the deposits TC deposited thereon are scraped by the scraper 21 enters the valve guide 17, since the small diameter shaft part 16D is provided and the inner diameter DS of the cutting edge 21H of the scraper 21 is made to be equal to the outer diameter DG of the large diameter shaft part 16T of the valve stem 16, defective sliding will not occur, and the EGR valve device 10 can be made compact by reducing the length of the valve stem 16.

Incidentally, the features of the scraper 21 and the valve stem 16 described herein correspond to a fourth aspect of the present invention.

As shown in FIG. 3, the case 12 is provided with a cylinder 12P, into which a piston 28 is inserted, so that a reciprocating-piston type hydraulic actuator for opening and closing the valve 14 is formed. The cylinder 12P is disposed above the valve stem 16. The piston 28 is provided with a spring groove 28M at the upper portion thereof. The lower portion of a piston spring 29 is inserted into the spring groove 28M. The upper portion of the piston spring 29 is pressed by a cap 31 mounted on the upper portion of the case 12, so that the piston 28 is pushed downward. The bottom surface of the piston 28 abuts the upper end of the valve stem 16.

The case 12 is provided with a stopper 12S for regulating the movement of the piston 28 of the hydraulic actuator so that the piston 28 is prevented from getting out. Owing to the stopper 12S, even when the valve spring 18 is broken and therefore the piston 28 is pushed down by the pressured oil, since the piston 28 stops by hitting the stopper 12S, the piston 28 is prevented from getting out from the cylinder 12P, thus the pressured oil does not flow into the oil chamber 27, and the pressure of the pressured oil can be maintained.

Incidentally, the features of the stopper 12S described herein correspond to a ninth aspect of the present invention.

A bushing bore 12B, into which a bushing 32 is inserted, is provided on the flank of the cylinder 12P of the case 12. The bottom portion of the bushing bore 12B is sealed by a plug 33. The bushing 32 is provided with a spool hole 32S, into which a spool 34 is inserted slidably in the longitudinal direction, and all these form a spool-type hydraulic control valve for controlling the hydraulic actuator. The spool 34 is pushed upward by a spool spring 35 fixed to the lower portion of the bushing bore 12B. The upper end of the spool 34 abuts a rod 13R of the solenoid 13. When electricity is applied to the solenoid 13, the rod 13R will drop due to the magnetic force of the solenoid 13, and thereby the spool 34 will be pushed downward.

Thus, the hydraulic actuator for opening and closing the valve 14 and the hydraulic control valve for controlling the hydraulic actuator are integrated with valve housing body 10H (refer to FIG. 1 and FIG. 2). Further, the hydraulic actuator and the hydraulic control valve are so arranged that both have the same advancing/retreating direction.

Incidentally, the features of the hydraulic actuator, the hydraulic control valve, and the housing body described herein correspond to a seventh aspect and a tenth aspect of the present invention.

The case 12 is provided with a cooling structure having an orifice 12V, which serves as a nozzle for jetting pressured oil for cooling. The orifice 12V is provided at the front end of a cooling oil passage 12W connected to an inlet port 32A of the bushing 32, and opened to an oil passage 12Z which connects an oil outlet 12OD (as shown in FIG. 2) formed in the case 12 and the oil chamber 27.

Further, as shown by the arrow Y in FIG. 3, the orifice 12V is oriented toward the valve guide 17, through which the valve stem 16 slides. Particularly, the cooling effect can be further enhanced if the orifice 12V is oriented toward the root section of the valve guide 17 on the bottom of the oil chamber 27 near the exhaust gas passage 11T.

Incidentally, the features of the orifice 12V described herein correspond to an eleventh aspect of the present invention.

Figure 7:
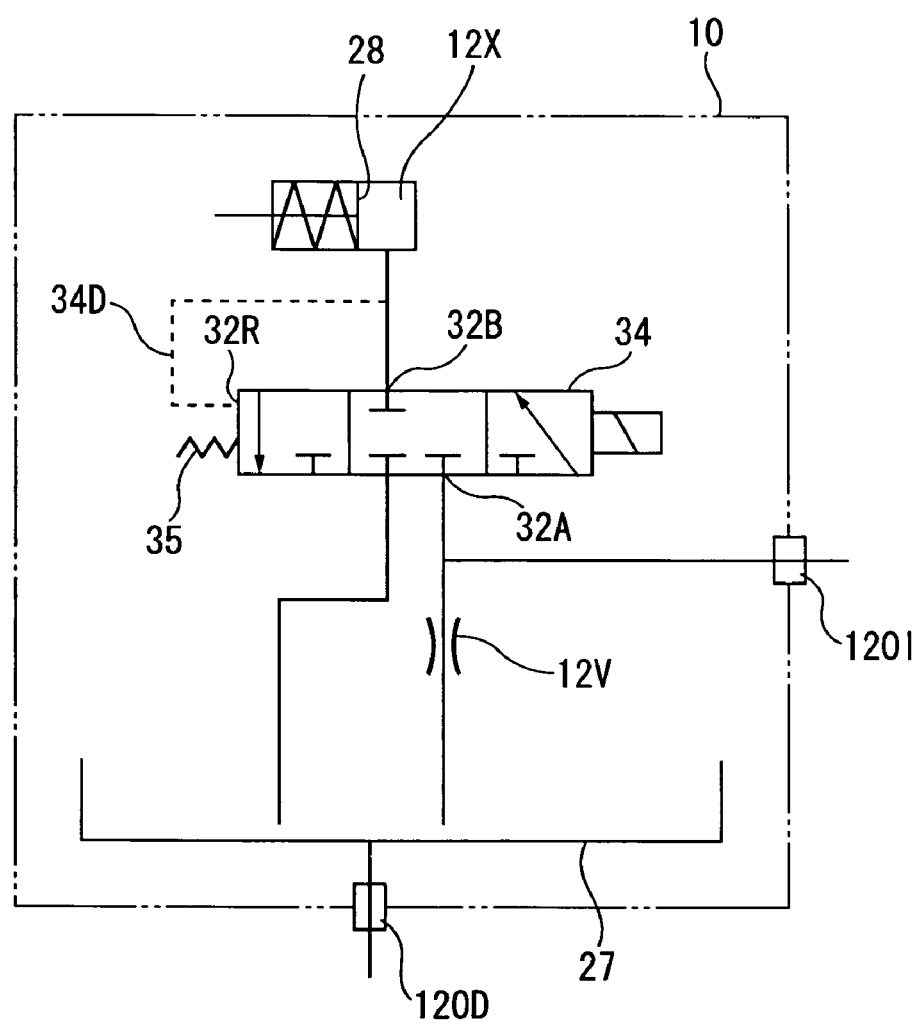
FIG. 7 is a hydraulic circuit diagram of the EGR valve device according to the present invention.

As shown in FIG. 3 and FIG. 7 (which shows a hydraulic circuit diagram of the EGR valve device 10), an oil inlet 12OI formed in the case 12 is connected to the inlet port 32A of the bushing 32, and the inlet port 32A is connected to the oil chamber 27 via the orifice 12V formed in the case 12. The oil chamber 27 is connected to the oil outlet 12OD formed in the case 12. An outlet port 32B of the bushing 32 is connected to an upper chamber 12X of the cylinder 12P. The outlet port 32B is connected to a pressure transmit passage 34D of the spool 34, and the pressure transmit passage 34D is connected to a spring chamber 32R of the lower portion of the bushing 32.

When electricity is applied to the solenoid 13 and thereby the spool 34 drops from the position as shown in FIG. 3, the pressured oil entered from the oil inlet 12OI (as shown in FIG. 1) of the case 12 will flow from the inlet port 32A of the bushing 32 into the upper chamber 12X of the cylinder 12P through a spool groove 34M of the spool 34, the outlet port 32B of the bushing 32, and an oil passage 12Y of the case 12. The pressure of the pressured oil entered into the upper chamber 12X is applied to the piston 28, and the piston 28 pushes the valve 14 downward against the force of the valve spring 18. Since the valve 14 moves away from the ring-shaped valve seat 15, the exhaust gas passage IIT opens to let the exhaust gas pass. Thus, the hydraulic control valve using the spool 34 is moved by the solenoid 13 which is an electromagnetic proportional actuator.

On the other hand, the pressured oil applies pressure to the spring chamber 32R of the lower portion of the bushing 32 from the outlet port 32B of the bushing 32 through the pressure transmit passage 34D of the spool 34, to push the lower end of the spool 34 upward. As a result, the spool 34 stops at a position where the force by which the rod 13R is pushed downward due to the electromagnetic force of the solenoid 13 and the force by which the spool 34 is pushed upward due to the pressured oil are balanced. In other wards, by adjusting the current passing through the solenoid 13, it is possible to control the spool 34 to stop at the position corresponding to the force generated by the solenoid 13, and therefore it is possible to control the quantity of exhaust gas circulated for performing EGR.

Further, the oil entered from the oil inlet 12OI of the case 12 passes the cooling oil passage 12W from the inlet port 32A of the bushing 32 and jets from the orifice 12V to cool the valve guide 17 through which the valve stem 16 slides, so that the valve stem 16 is prevented from being overheated by the heat of the exhaust gas.

Herein, the pressured oil to be entered from the oil inlet 12OI of the case 12 is the oil generated by an engine equipped with a EGR device during the operation of the engine. Thus, it is not necessary to prepare an additional energy source for generating the pressured oil, so that the structure can be simplified.

Incidentally, the features regarding the supplying of the pressured oil herein correspond to a twelfth aspect of the present invention.

Figure 9:
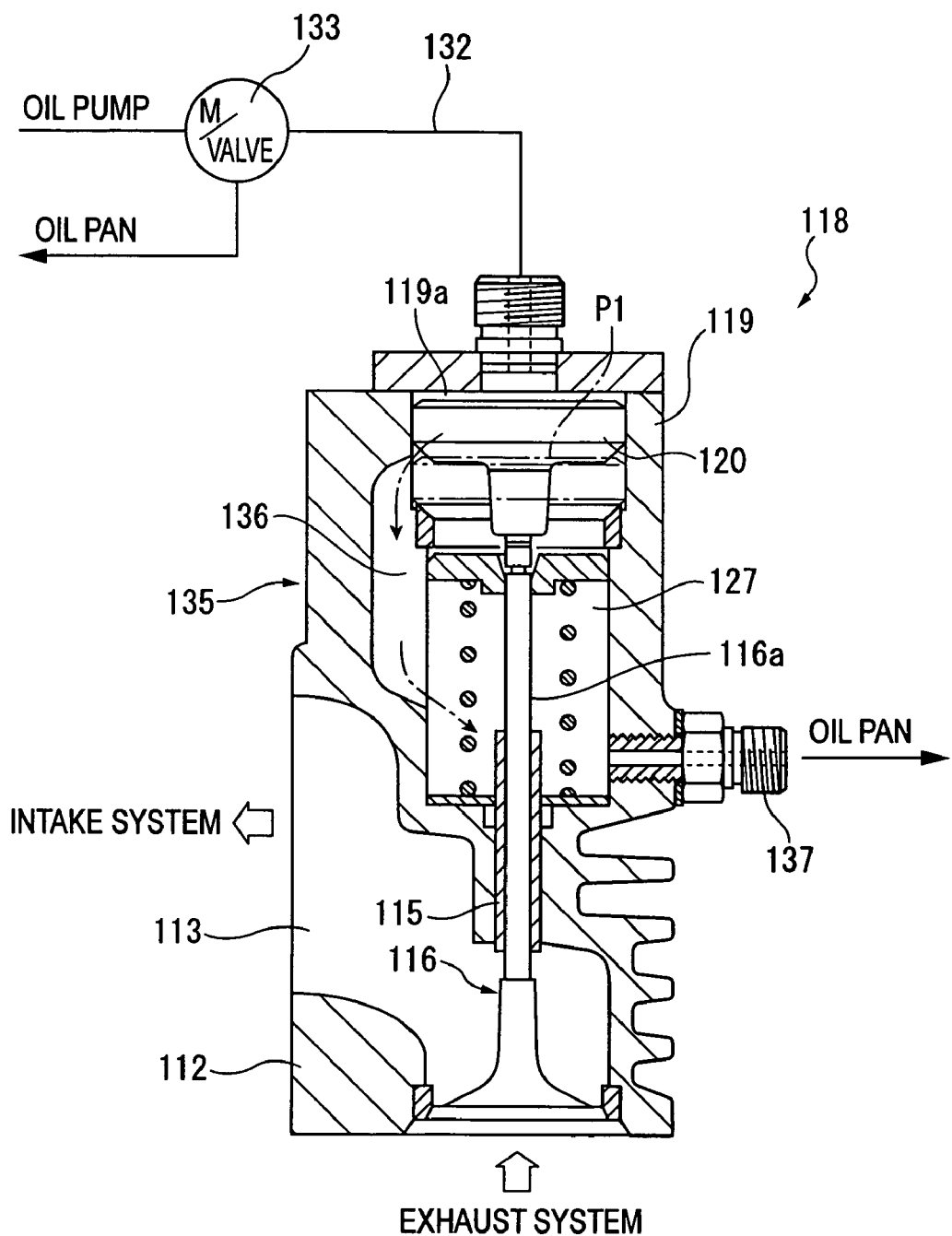
FIG. 9 is a cross section showing an EGR valve device according to a prior art (disclosed in the Patent Document 2)
Figure 10:
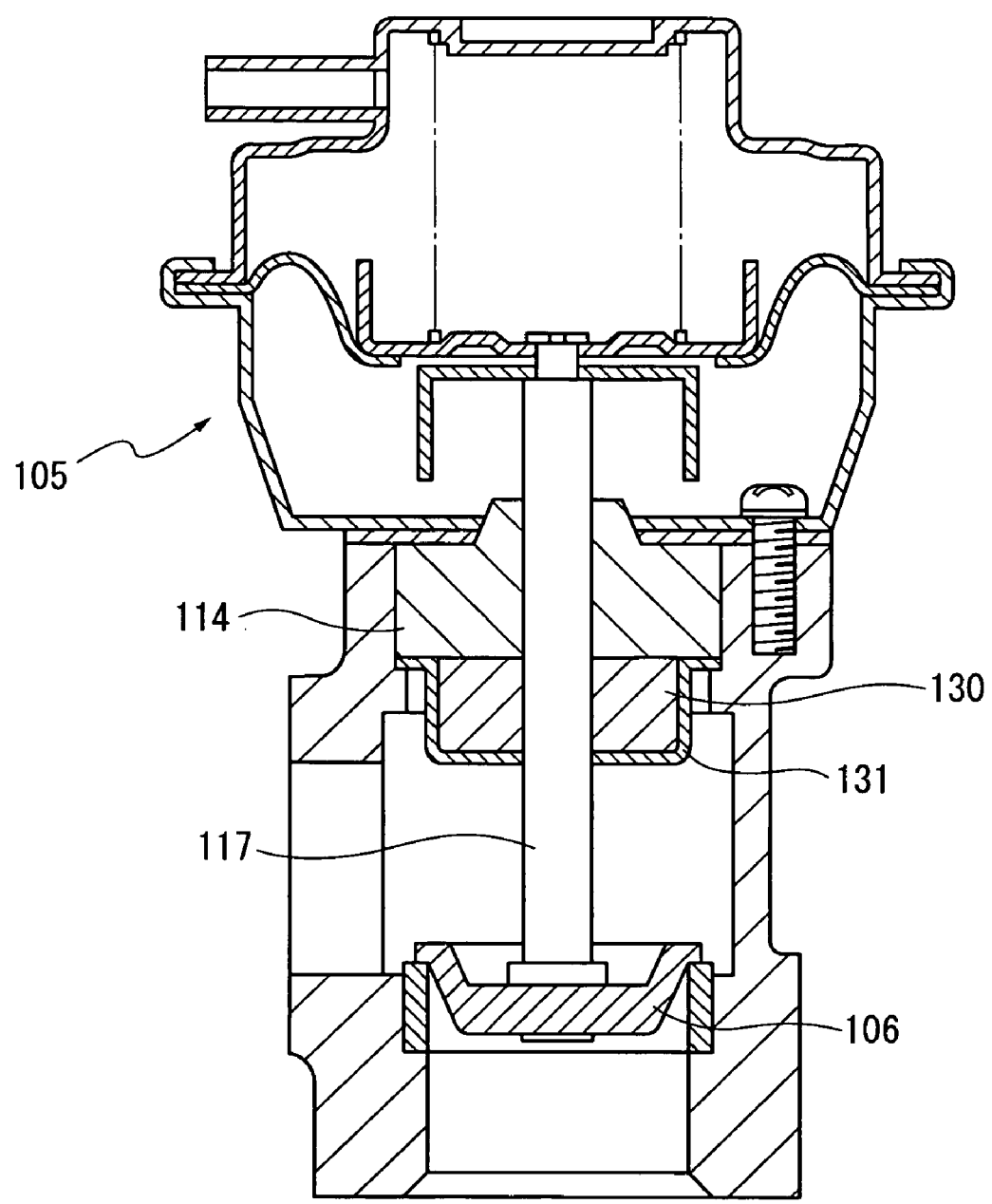
FIG. 10 is a cross section showing an EGR valve device according to a prior art (disclosed in the Patent Document 2).

As shown in FIG. 7, the pressured oil entered from the oil inlet 12OI of the case 12 enters the oil chamber 27 through the orifice 12V and flows out from the oil outlet 12OD, and the pressured oil flows constantly In the conventional EGR valve device, as shown in FIG. 9, the cooling and lubricating section 135 only operates while the EGR valve device works so that the high temperature exhaust gas flows, and the cooling and lubricating section 135 does not operate while the EGR valve device is not working. In contrast, in the conventional EGR valve device according to the present invention, the valve stem 16 is constantly cooled by the pressured oil entered from the oil inlet 12OI of the case 12. Thus the valve stem 16 can be prevented from being overheated even when the EGR valve device 10 is closed, and seizure generated at valve stem 16 due to the carbon and the like contained in the exhaust gas can be suppressed. Since the orifice 12V is oriented toward the valve guide 17 through which the valve stem 16 slides, the cooling can be performed effectively.

Incidentally, the features of the orifice 12V described herein correspond to a thirteenth aspect of the present invention.

Figure 8:
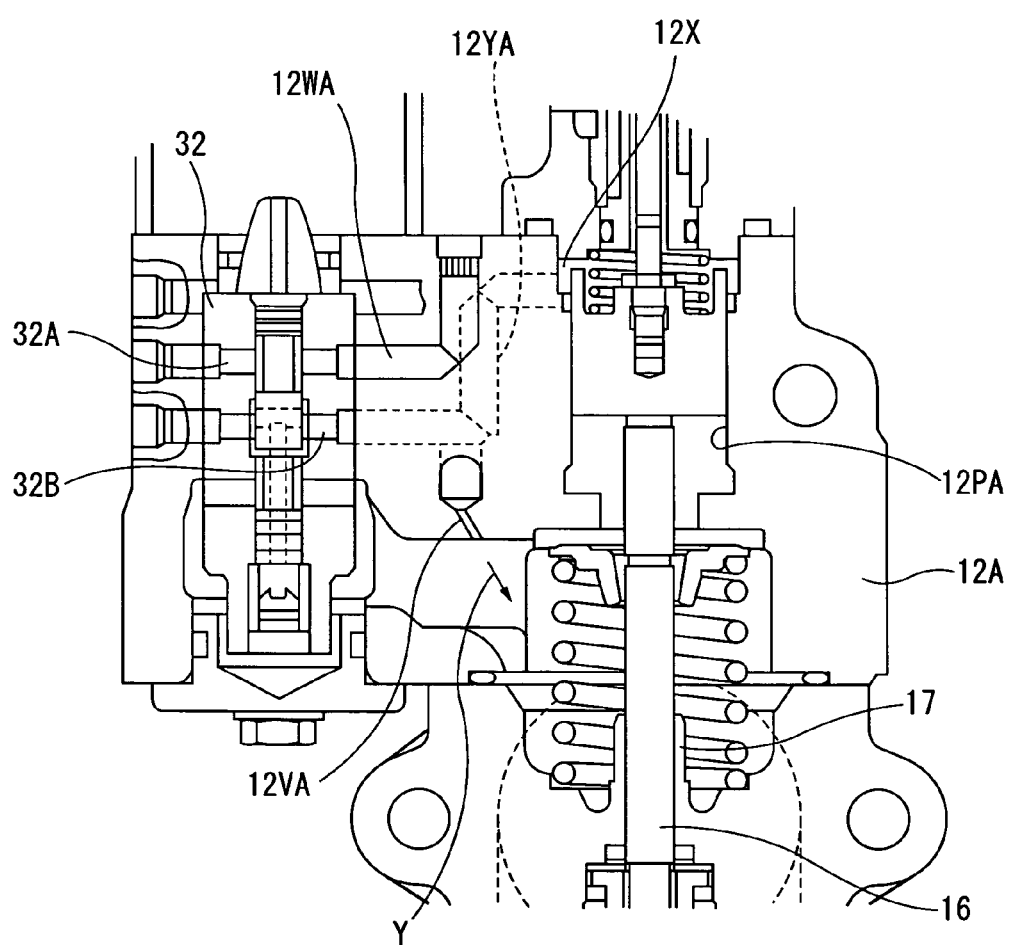
FIG. 8 is an illustration showing another example of a cooling structure of the EGR valve device according to the present invention.

According to necessary, as shown in FIG. 8, the cooling structure also can be the one in which the cooling oil passage led to an orifice 12VA for jetting pressured oil for cooling is provided by branching from an oil passage 12YA that passes the oil from the outlet port 32B of the bushing 32 to the upper chamber 12X of the cylinder 12PA of the case 12A, instead of an oil passage 12WA connected to the inlet port 32A of the bushing 32. The orifice 12V can be, as is described above, oriented toward the root section of the valve guide 17 on the bottom of the oil chamber 27 near the exhaust gas passage 11T.

Incidentally, the features of the orifice 12VA described herein correspond to a fourteenth aspect of the present invention.

As showing in FIG. 3, a moving rod 36 for detecting the stroke of the piston 28 is mounted at the upper portion of the piston 28 in its axial direction. The moving rod 36 is inserted into an bore 51N of the position sensor 51, and the position sensor 51 detects the stroke of the piston 28 by detecting the change in magnetic force caused by the change of the position of a magnet 36M of the moving rod 36. Thus the stroke of the valve 14 can be detected, and the opening level of the EGR valve device 10 can be controlled by a controller such an electrical controller (not shown).

According to the present embodiment, the following advantages can be achieved.

For the first problem, by providing a scraper 21 having a truncated cone-cutting edge, the deposits TC such as carbon contained in the exhaust gas and deposited on the surface of the valve stem 16 can be scraped when the valve stem 16 slides upward. Thus defective operation of the valve caused by the deposits can be prevented from occurring.

Further, by specifying the diameter difference TS between the inner diameter DS of the scraper 21 and the outer diameter DJ of the valve stem 16, the valve stem 16 is prevented from being fixed, and the deposits TC can be scraped effectively.

Further, by specifying the relation between the distance L from the end of the valve stem 16 to the scraper 21, the inner diameter DS of the cutting edge 21H of the scraper 21, and the outer diameter DG of the valve stem 16, the defective sliding can be prevented from occurring even if the deposits remains on the valve stem 16.

Owing to the features of the seal 25 described above, foreign matter contained in the exhaust gas can be prevented from entering into the valve guide 17.

Thus, owing to these advantages, it is possible to provide an EGR valve device 10 which never fails in operation even if it is used for a long period of time.

For the second problem, since the controlling device having the solenoid 13 and the spool 34 for controlling the operation of the valve 14 is integrated with the valve housing body 10H composed of the housing 11 and the case 12, pipes for connecting the controlling device and the valve are not needed, therefore components can be reduced. Further, since the EGR valve device can be concentrated as a whole, the device can be made compact compared to the case in which the controlling section is provided separately from the valve body.

Further, since the valve housing body can be easily separated into the housing 11 and the case 12, the component can be replaced independently even if failure occurs, so that maintenance cost can be reduced. Further, by providing bolt holes and screw holes on the circumference centering the axis of valve 14, the case 12 can be mounted to the housing 11 in a manner able to be displaced from the housing 11 in circumferential direction, and therefore it is possible to choose the mounting direction according to the mounting place to make the assembly easy.

Further, since the spool-type hydraulic control valve and the hydraulic actuator are arranged parallel in their longitudinal directions, the hydraulic circuit can be easily formed, and the space for installing the EGR valve device can be reduced.

Thus, owing to these advantages, it is possible to provide a compact EGR valve device 10 having less components.

For the third problem, since the pressured oil is jetted toward the valve guide, the valve stem can be effectively cooled.

Further, since the pressured oil for cooling is jetted from the nozzle branched from the pressured oil supply circuit, another hydraulic source for cooling is not necessary, so that the structure is simplified.

Further, since the pressured oil for cooling is jetted from the nozzle branched from the pressured oil supply circuit for the hydraulic control valve for controlling the hydraulic actuator, the valve stem can be constantly cooled. On the other hand, in the case that the cooling oil passage led to the orifice 12VA is provided by branching from the oil passage 12YA that passes the oil from the hydraulic control valve to the hydraulic actuator, although the cooling oil can only be jetted while the EGR valve device 10 is working, since the nozzle is provided very close to the hydraulic circuit for driving the hydraulic actuator, processing and structure can be simplified.

Accordingly, owing to these advantages, it is possible to provide an EGR valve device 10 having good cooling performance.

Incidentally, the scope of the present invention is not limited to the embodiment described above, but includes other arrangement such as below-described modifications as long as the objects of the present invention can be achieved.

For example, although the valve 14 is driven by the hydraulic actuator according to the aforesaid embodiment, driving section for driving the valve 14 can also be an electrical drive, a pneumatic drive or the like, instead of a hydraulic drive. For example, driving section by a pneumatic cylinder, by an electromagnetic solenoid, or by combination of a step motor and a worm gear can be employed.

Further, the controlling device can be installed directly on the housing so as to be integrated with the housing.

Though the preferred configurations and methods are described above, the present invention is not limited thereto. In other words, though the present invention is mainly illustrated and described based on specific embodiment thereof, it should be understood that various changes in the shape, quantity, and other details of construction can be made by those skilled in the art based on the embodiment described above without departing from the spirit and objects of technical characteristics of the present invention.

Accordingly, the description disclosed above, which gives specific shape, quantity and the like, is just an exemplary description to make the present invention well understood instead of being a definition of the limits of the invention, therefore the description based on the component name with part or all of the specific shape, quantity and the like omitted is included in the present invention.

INDUSTRIAL APPLICABILITY

The present invention can be used as a valve device, and particularly can suitably be used as a valve device for performing EGR.

The invention claimed is:

1. An EGR valve device comprising:
A valve housing body;
A hydraulic actuator provided on the valve housing body to open and close a valve;
an electromagnetic proportional actuator provided on the valve housing body; and
A hydraulic control valve advanced and retracted by the electromagnetic proportional actuator, the hydraulic control valve controlling hydraulic pressure acting on the hydraulic actuator by balancing a force of the electromagnetic proportional actuator and a hydraulic force; wherein
the hydraulic actuator and the hydraulic control valve are integrated with the valve housing body.

2. The EGR valve device according to claim 1,
wherein the valve housing body is separated into a valve section including the valve and a drive section including the hydraulic actuator and the hydraulic control valve; and
fixing sections for the valve section and the drive section are provided on a circle around an axis of the valve.

3. The EGR valve device according to claim 1,
wherein the hydraulic actuator is provided with a stopper for preventing a piston from disengaging from a hydraulic cylinder.

4. The EGR valve device according to claim 1,
wherein the hydraulic actuator is a reciprocating-piston type hydraulic actuator;
the hydraulic control valve is a spool hydraulic control valve; and
the hydraulic actuator and the hydraulic control valve are arranged in parallel with a same advancing/retreating direction.

5. An EGR valve device comprising:
a valve housing body;
a valve guide provided inside the valve housing body for guiding a slide movement of a valve stem; and
a nozzle arranged toward the valve guide and having an orifice for jetting cooling oil.

6. The EGR valve device according to claim 5,
wherein a hydraulic pressure supplied to the nozzle is generated by an internal combustion engine equipped with the EGR valve device during an operation of the internal combustion engine.

7. The EGR valve device according to claim 5, further comprising:
a hydraulic actuator for opening and closing a valve; and
a hydraulic control valve for controlling the hydraulic actuator; wherein
a hydraulic pressure supplied to the nozzle is a hydraulic pressure branched from a hydraulic circuit for supplying the hydraulic pressure to the hydraulic control valve.

8. The EGR valve device according to claim 5, further comprising:
a hydraulic actuator for opening and closing a valve; and
a hydraulic control valve for controlling the hydraulic actuator; wherein
a hydraulic pressure supplied to the nozzle is a hydraulic pressure branched from a hydraulic circuit connecting the hydraulic actuator and the hydraulic control valve.

9. A valve device comprising:
a valve housing body having a passage for fluid;
a valve guide arranged in the valve housing body;
a valve stem sliding in the valve guide to open and close a valve; and
a scraper provided on a passage side of the valve guide, the scraper having a lower portion with an inner diameter and an outer diameter which decrease toward a lower end to thereby form a truncated cone-shaped cutting edge, the inner diameter of the cutting edge including a straight bore parallel to the valve stem at an end thereof.

10. The valve device according to claim 9,
wherein the inner diameter of the cutting edge of the scraper is 0.2-1.0 mm larger than an outer diameter of the valve stem.

11. The valve device according to claim 9,
wherein a distance between an end of the scraper and a passage side end of the valve guide is longer than a stroke of the valve.

12. The valve device according to claim 9, wherein
an outer diameter of the valve stem is smaller in a section corresponding to the scraper than in a section corresponding to the valve guide; and
the inner diameter of the cutting edge of the scraper is equal to an outer diameter of the valve stem in a section corresponding to the valve guide.

13. The valve device according to claim 9,
wherein a seal member that applies gripping force onto an outer circumference of the valve stem is provided at a passage side end of the valve guide.

14. The valve device according to claim 9,
wherein the fluid is exhaust gas recirculated to an internal combustion engine for performing EGR, and the valve device is an EGR valve.

15. The valve device according to claim 9, wherein the straight bore has a length of 1 mm.

16. The valve device according to claim 9, wherein the straight bore defines a cylindrical surface around the end of the valve stem.

17. The valve device according to claim 9, wherein the inner diameter of the lower portion defines an inner conical surface and the outer diameter of the lower portion defines an outer conical surface, the straight bore being situated between a lower edge of the inner conical surface and a lower edge of the outer conical surface.

18. The valve device according to claim 9, wherein the inner diameter of the lower portion of the scraper, including the straight bore, is spaced apart from the end of the valve stem around the circumference thereof.

* * * * *